Feb. 28, 1939.  W. F. GROTE  2,149,171
SHEET REFLECTOR
Filed Aug. 9, 1937
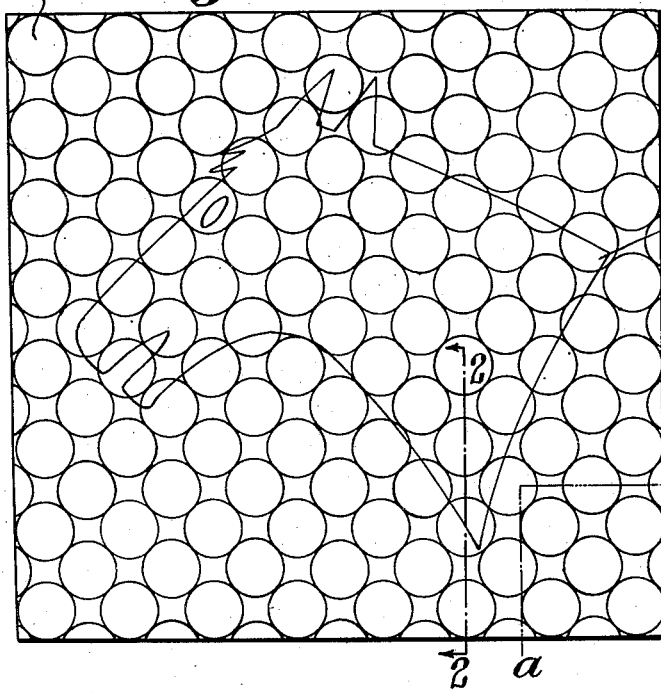
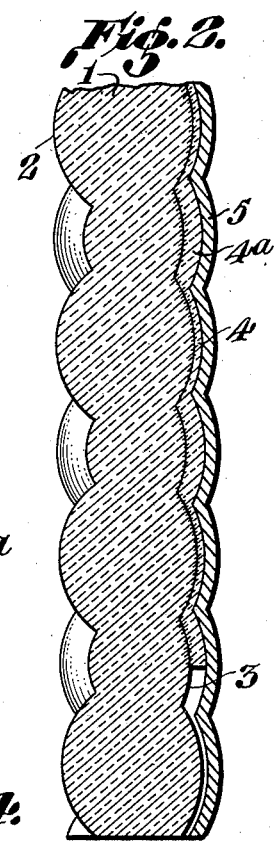
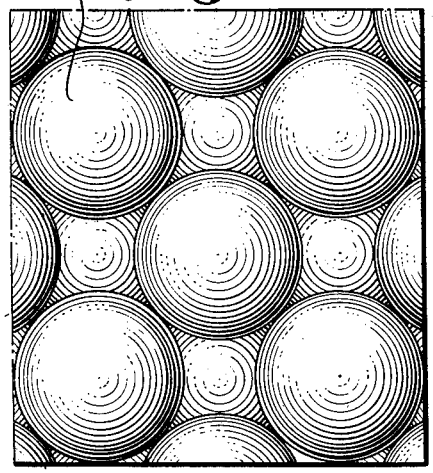
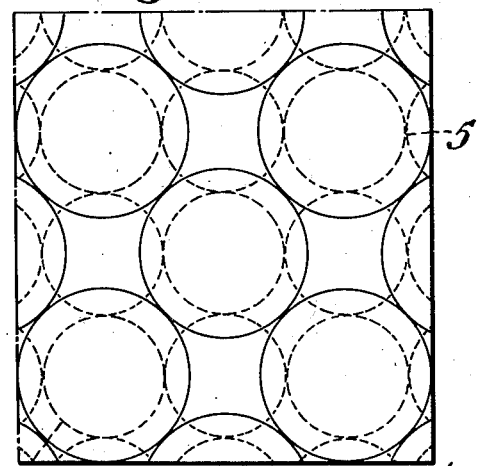
Inventor:
Walter F. Grote
by Toulmin & Toulmin
Attorney Patented Feb. 28, 1939

2,149,171

UNITED STATES PATENT OFFICE 2,149,171

SHEET REFLECTOR

Walter F. Grote, Mount Washington, Ohio, assignor to The National Colortype Company, Bellevue, Ky., a corporation of Kentucky Application August 9, 1937, Serial No. 158,175

6 Claims. (Cl. 40—135)

This invention relates to a light reflecting medium adapted to reflect light in different colors and different designs It is a further object to provide in combination a light transmitting and light reflecting medium having a plurality of light reflecting lenses, preferably aspherical, is combination with colored areas to indicate designs and in combination with light reflecting areas and light transmitting areas.

It is a further object to provide such a medium in which the design is formed in the medium or on the back thereof in such a manner as to give the effect of depth, third dimension and animation, particularly as the light source sweeps across the medium and the incident light is reflected back into the eyes of the observer adjacent the light source, as in the case of a driver of an automobile whose lamps are illuminated when the light from the lamps sweeps over the medium having the characteristics of this invention.

Figure 1 is a front view of the subject of this invention.

Figure 2 is a section on the line 2—2 of Figure 1.

Figure 3 is an enlarged view of that portion of Figure 1 indicated by the lines a—a.

Figure 4 is an outline view of the structure shown in Figure 3, showing in full line circles the front lenses and in dotted lines the circular outlined parts of the reflector element of which the hills and valleys (referred to hereinafter), are formed.

Referring to the drawing in detail, it will be noted that the sheet of glass, synthetic resin or other plastic material forms an autocollimating reflector. The body 1 has a front lens face 2 and a rear lens face 3 of diverse curvature. The front of each of these lens faces is convex in cross section to provide convex high and alternate convex low, or valley portions so as to be placed in interengagement with the associated lenses.

Behind a portion of this body 1 are colored areas to form the design 4 such as a horse's head. This design may be formed by a colored surface on the reflector 5 or it may be molded integral with the body 1 or applied to the front or rear surface thereof.

Preferably the body 1 has the colored design on the back of the body 1 upon the rear lens faces 3. As the lens faces 2 are formed to focus incident light on the rear curved faces 3, these rear lens faces are covered with a light reflecting material 5. If desired, a portion of this reflector 5 can be colored to indicate the design such as the horse's head 4. The remainder of the background can be clear or silver.

If it is desired, the design can be placed on the front of the body 1 upon the lens faces 2, in which event suitable transparent, colored lacquers may be employed or a colored insert may be made in the body 1 during the course of its molding.

As will be seen in Figure 2, this colored area is indicated by the numerals 4 and 4a. If a plastic backing material of some transparent color is used, it may appear as thick as at 4a to give the effect of depth. If the area 4a is not filled, the material reflector 5 may be colored as indicated by the heavy line 4.

The design may be cut out of either transparent or opaque material and caused to adhere to the back of this multiple lens, light reflecting body while the area around it will be transparent or translucent for both light reflection and for transmitted light.

By reference to Fig. 2, it will be seen that the coating 4a is somewhat thicker than the coating 4. Moreover, the face of the lens is spaced a greater distance from the reflecting medium in alternate spaces. The design element is made up of material which is at least partially translucent so that the light passing through the lens face 2 will reach the reflecting medium 5 and be reflected back through said design element and lens element.

The structure cited in the preceeding paragraph will give the effect of depth and/or animation to the design element, particularly when a light source sweeps across the article and the incident light is reflected back to the eyes of an observer adjacent the light source, as would be the case of a driver of an automobile whose lamps are illuminated and where the light from said lamps sweeps over said element having the characteristics above described. This is due not only to the fact that the body of the lens is provided with a multiplicity of front or rear lens faces but is also due to the combination of these front or rear lens faces with a structure which includes a design element which is at least partially transparent and which has areas of different thicknesses located between a sheet of transparent material and the reflecting medium.

It will be understood that I desire to comprehend within my invention such modifications as come within the scope of the claims and the invention.

Having thus fully described my invention, what

I claim as new and desire to secure by Letters Patent, is:

1. A new article of manufacture comprising a sheet of plastic transparent material having both front and rear sides constituted entirely of lenticular protuberances and having a design element formed of at least partially translucent material integral with said transparent material, said protuberances being alternately of greater or less curvature in cross section to form hills and valleys and said design element being of such thickness in certain of said valleys to fill the same to substantially the level of said hills, whereby to give said design the appearance of depth and dimension when a light source is swept across said sheet.

2. A new article of manufacture comprising a sheet of transparent material having a multiplicity of rear lens faces, a design element at least partially transparent mounted adjacent to said rear lens faces and a light reflecting medium at the back thereof with the design element between said sheet and said reflecting medium, certain of said rear lens faces being spaced different distances from portions of said light reflecting medium than other portions of said rear lens faces, and said design element having areas of different thickness filling in the spaces between the rear lens faces and differently spaced portions of said light reflecting medium whereby to give the effect of greater depth to certain areas of said design.

3. A new article of manufacture comprising a sheet of plastic transparent material having a multiplicity of rear lens faces, a design element at least partially transparent mounted adjacent to said rear lens faces and a light reflecting medium at the back thereof with the design element between said sheet and said reflecting medium, certain of said rear lens faces being spaced different distances from portions of said light reflecting medium than other portions of said rear lens faces, and said design element having areas of different thickness filling in the spaces between the rear lens faces and differently spaced portions of said light reflecting medium whereby to give the effect of greater depth to certain areas of said design.

4. A new article of manufacture comprising a sheet of transparent material having a multiplicity of front and rear lens faces, a design element at least partially transparent, mounted on the rear lens faces, and a light reflecting medium at the back thereof with the design element between said sheet and said reflecting medium, certain of said rear lens faces being spaced different distances from portions of said light reflecting medium than other portions of said rear lens faces, and said design element having areas of different thickness filling in the spaces between the rear lens faces and differently spaced portions of said light reflecting medium whereby to give the effect of greater depth to certain areas of said design.

5. A new article of manufacture comprising a sheet of plastic transparent material having a multiplicity of rear lens faces, a colored design element at least partially transparent, mounted adjacent to the rear lens faces and a light reflecting medium at the back thereof with the design element between said sheet and said reflecting medium, certain of said rear lens faces being spaced different distances from portions of said light reflecting medium than other portions of said rear lens faces, and said design element having areas of different thickness filling in the spaces between the rear lens faces and differently spaced portions of said light reflecting medium whereby to give the effect of greater depth to certain areas of said design.

6. A new article of manufacture comprising a sheet of plastic transparent material having a multiplicity of convex rear lens faces and a colored translucent design element permanently attached to said convex lens faces and a light reflecting medium having a plurality of concave portions located adjacent to the convex portions of said rear lens faces with the design element between said sheet and said reflecting medium, certain of said rear lens faces being spaced different distances from portions of said light reflecting medium than other portions of said rear lens faces, and said design element having areas of different thickness filling in the spaces between the rear lens faces and differently spaced portions of said light reflecting medium whereby to give the effect of greater depth to certain areas of said design.

WALTER F. GROTE.